UNITED STATES PATENT OFFICE.

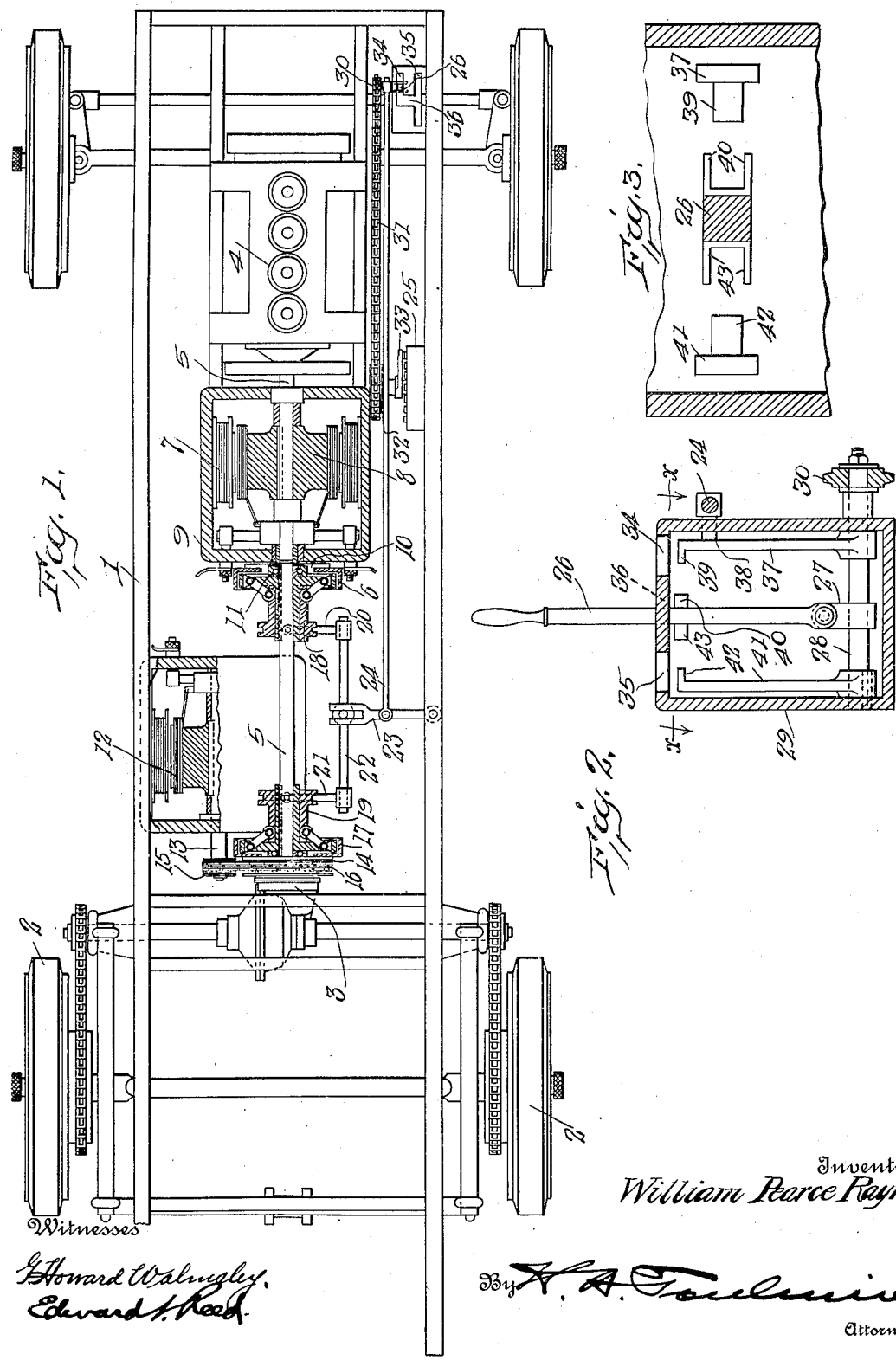
W. P. RAYNER.
MOTOR VEHICLE.
APPLICATION FILED JUNE 23, 1910.
1,064,089.
Patented June 10, 1913.
Inventor
William Pearce Rayner,

WILLIAM PEARCE RAYNER, OF PHILADELPHIA, PENNSYLVANIA.

MOTOR-VEHICLE.

1,064,089.

Specification of Letters Patent. Patented June 10, 1913.

Application filed June 23, 1910. Serial No. 568,540.

*To all whom it may concern:*

Be it known that I, WILLIAM PEARCE RAYNER, a citizen of the United States, residing at Philadelphia, in the county of Philadelphia and State of Pennsylvania, have invented certain new and useful Improvements in Motor-Vehicles, of which the following is a specification, reference being had therein to the accompanying drawings.

This invention relates to motor vehicles and more particularly to vehicles in which the motive power is derived from the combination of an engine with an electric motor.

The object of the invention is to provide a practical vehicle of this type adapted to be started and to be driven at low speed and on low gear work by the electric motor and to be driven at high speed by the engine; and to so arrange the mechanism as to secure an easy and simple control and to obviate the necessity for using sliding gears.

To this end it is a further object of the invention to provide a two part driving shaft, one part of which is connected with the engine and the other part of which is connected with the transmission gearing; to provide an electric generator having its armature mounted upon that portion of the driving shaft which is connected with the engine; to provide an electric motor to receive its current directly from said generator and having its shaft connected by suitable reducing gearing with that portion of the driving shaft which is connected with the transmission gearing; to provide suitable clutch mechanisms for connecting the reducing gearing and that portion of the shaft which is connected with the engine with that portion of the driving shaft which is connected to the transmission gearing; and to control these clutch mechanisms in unison so that it will be impossible to have the engine and the motor both connected with the transmission gearing at the same time.

It is also an object of the invention to provide a single controlling lever by means of which either the engine or the motor may be connected with the transmission gearing, which will disconnect the one driving member when it connects the other and by means of which the rheostat controlling the motor may be actuated.

In the accompanying drawings, Figure 1 is a top, plan view of a motor truck embodying my invention with all the superstructure removed; Fig. 2 is a detail view of the controlling lever and its coöperating parts; and Fig. 3 is a sectional view, taken on the line $x$ $x$ of Fig. 2 and looking in the direction of the arrows.

In these drawings I have illustrated one embodiment of my invention and have shown the same as applied to a motor truck designed for transporting merchandise and the like, but obviously the invention is not confined to trucks of this character but may be applied to motor driven vehicles of various types. The vehicle here shown comprises a main frame 1 having driving wheels 2 which receive their motion through suitable transmission gearing, which is here shown in conventional form at 3. Mounted upon the main frame and preferably near the forward end thereof is an explosive engine 4, of any suitable construction, having a shaft 5 extending rearwardly therefrom. This shaft is divided into two parts, the forward portion of which is directly connected with the engine and forms the engine shaft proper, while the rear portion is connected with the transmission gearing and is adapted to be connected with and disconnected from the forward portion by a suitable clutch mechanism, as indicated at 6.

An electrical generator 7 is operatively connected with the forward portion of the driving shaft, and, in the present instance, the armature 8 of the generator is mounted directly upon that shaft. The forward portion of the shaft is mounted in bearings carried by a frame or casing 9 containing the generator and that end of the forward portion of the shaft which extends beyond the rear side of that frame has rigidly secured thereto a disk or plate 10 forming one member of the clutch mechanism 6 and having formed therein a ball bearing 11 which receives and supports the forward end of the rear portion of the driving shaft.

An electric motor 12 is supported by the main frame and is preferably arranged at one side of the driving shaft and with its armature shaft extending substantially parallel with the driving shaft. This motor receives its current directly from the generator 7. The armature shaft, which is indicated at 13, may be connected with the transmission gearing 3 by gearing of any suitable character. In the present instance I have employed gearing of the type known as the "silent chain drive." This gearing comprises a gear 14 which is loosely mounted on the shaft 5 near the transmission gearing 3 and a pinion 15 which is rigidly secured to the motor shaft 13, the pinion and gear being connected by a chain 16. The gear 14 is adapted to be connected to the shaft 5 by means of suitable clutch mechanism 17. The clutch mechanism 6 and 17 may be of any suitable type, and, as here shown, each comprises a sleeve, indicated at 18 and 19, respectively, slidably mounted on the rear portion of the shaft 5 and adapted to be actuated by yokes 20 and 21, respectively, in the usual manner. These clutch mechanisms are preferably controlled in unison and in such a manner that the motor and the engine cannot both be connected with the rear portion of the shaft 5 and with the transmission gearing at the same time. As here shown, this is accomplished by mounting the yokes 20 and 21, by means of which the clutch mechanisms are actuated, upon a rod 22 to which is operatively connected one end of a lever 23 pivotally mounted on the main frame and adapted to be actuated by an operating rod 24 under the control of the operator. The clutch mechanisms are so arranged that the sleeves 18 and 19 are moved in opposite directions to connect the two parts of the respective clutches. Consequently, when the rod 22 and the yokes carried thereby are moved in one direction, one sleeve will be moved in a direction to connect the two parts of its clutch member and the other sleeve will be moved in a direction to disconnect the two parts of its clutch member and vice versa. In operating this mechanism the engine 4 is started in the usual manner and the armature 8 is rotated with the forward portion of the shaft 5. The current from the generator is transmitted directly to the motor 12 and is controlled by a rheostat 25. When it is desired to start the vehicle the clutch mechanism are actuated to disconnect the two parts of the shaft 5 and to connect the motor with the rear portion of that shaft, and, consequently, with the transmission gearing. The motor being connected to the transmission gearing by reducing gearing and the speed of the motor being controlled by the rheostat 25 it will be apparent that the first movement imparted to the driving wheels may be very slow and yet powerful, thus starting the vehicle without jar or jerk. The speed may be gradually increased through the rheostat, and, if desired, by controlling the speed of the engine 4 in the usual manner and thereby controlling the amount of current produced by the generator 7. If working under a heavy load and it is desirable to move at a slow speed or on a low gearing the electrical drive may be continued in use. If desired to operate at a higher speed the electrical drive is gradually advanced until the speed approaches that of the engine and the clutch mechanisms are then reversed to disconnect the motor from the transmission mechanism and to connect the engine directly therewith, thus driving the vehicle directly from the engine. When the engine is connected directly with the transmission gearing it is, of course, unnecessary to operate the generator 7, and, consequently, the field coils are cut out in the usual manner and the armature allowed to run idle, thereby imposing little or no drag upon the shaft and serving as a fly wheel.

The clutch mechanisms and the rheostat may be controlled in any suitable manner, but for convenience of operation I prefer to provide a single operating lever which will control both clutch mechanisms and the rheostat. While various arrangements of the lever and its coöperating devices may be provided I have here illustrated an arrangement which will satisfactorily accomplish the desired results. As here shown this mechanism comprises a lever 26 pivotally connected at its lower end to a collar 27, which collar is journaled on a shaft 28. The shaft 28, in turn, is journaled in a casing 29 supported from the main frame and has one end extending beyond the side of the casing and provided with a sprocket wheel 30 which is connected by means of a sprocket chain 31 with a similar sprocket wheel 32 which is connected with the rheostat arm 33. It will be noted that the lever 26 is pivoted to the collar 27 on an axis extending transversely to the shaft 28. The top of the casing 29 is provided with suitable guideways for the lever, which, as here shown, comprise two parallel slots 34 and 35 connected by a transverse slot 36. The handle 26 extends upwardly through the top of the casing and is adapted to be moved through these slots. Arranged at one side of the casing and adapted to move in a line parallel with the slot 34 is an arm or lever 37 journaled at its lower end on the shaft 28 and having a pin 38 which extends through the side of the casing 29 and is connected with the operating rod 24 for the clutch mechanisms. The upper end of the arm 37 has an inwardly extending finger 39 adapted to enter the space between two parallel lugs 40 carried by the adjacent side of the lever 26. A similar arm 41 is arranged near the opposite side of the casing 29 and is rigidly secured at its lower end to the shaft 28 and has at its upper end a finger 42 adapted to be actuated by lugs 43 carried by the lever 26. As shown in Fig. 2, the lever is in a central position in the transverse slot 36 and the actuating rod 24 is in its rearmost position with the motor connected to the transmission mechanism and the engine disconnected therefrom. The rheostat is in its idle position and no current is passing to the motor 12. If the lever 26 be moved toward the slot 35 the lugs 43 will engage the finger of the arm 41 and a forward movement of the lever will rotate the shaft 28 and thus actuate the rheostat to start the motor. Obviously, so long as the lever is in the slot 35 the clutch mechanism can not be shifted to connect the engine to the rear portion of the shaft 5. When it is desired to connect the engine to the shaft the lever must be moved rearwardly, thus moving the rheostat into its idle position and then transversely into the slot 34 and into engagement with the finger 39 of the arm 37. The forward movement of the lever will then reverse the clutch mechanisms, disconnecting the motor from the rear portion of the shaft and connecting the engine to the rear portion of the shaft. This operation, of course, can be performed very quickly and the engine connected to the transmission mechanism before the speed of the machine has decreased perceptibly. The idle position for the lever, i. e., with both clutch mechanisms disconnected, is central of the slot 34, as shown in Fig. 1, and in the position shown in Fig. 2 the motor is connected to the shaft 5, but the current is cut off so that this also is a neutral position. When the direct drive or engine drive is used the speed is, of course, controlled by throttling the engine in the usual manner or through the differential gearing which constitutes the transmission gearing.

While I have shown and described one arrangement of the mechanism it will be apparent that this arrangement, as well as the detail construction of the several parts, may be varied without departing from the principle of my invention, and I, therefore, wish it to be understood that I do not desire to be limited to the details of construction shown and described, for obvious modifications will occur to a person skilled in the art.

Having thus fully described my invention, what I claim as new and desire to secure by Letters Patent, is:—

1. In a motor driven vehicle, the combination, with driving wheels, gearing to transmit motion to said wheels, and an engine, of an electric generator operatively connected with said engine, an electric motor arranged to receive its current from said generator, and means for simultaneously connecting said engine with said transmission gearing and disconnecting said motor therefrom.

2. In a motor driven vehicle, the combination, with driving wheels, gearing to transmit motion to said wheels, and an engine, of an electric generator operatively connected with said engine, an electric motor arranged to receive its current from said generator, means for connecting said engine directly with said gearing, means for connecting said motor with said gearing, and means for preventing said motor and said engine from being connected with said gearing at the same time.

3. In a motor vehicle, the combination, with driving wheels, gearing to transmit motion to said driving wheels, an engine, a shaft to directly connect said engine to said transmission gearing, and means to interrupt said connection, of an electrical generator operatively connected with said engine, an electric motor arranged to receive current from said generator and having its shaft substantially parallel with the first-mentioned shaft and operatively connected with said transmission gearing, and means to interrupt said last-mentioned connection.

4. In a motor driven vehicle, the combination, with driving wheels, gearing to transmit motion to said driving wheels, an engine, a shaft to directly connect said engine to said transmission gearing, and means to interrupt said connection, of an electrical generator having its armature mounted on said shaft, an electric motor arranged adjacent to said shaft, supported independently thereof and adapted to receive current from said generator, and means to operatively connect said motor with said transmission gearing.

5. In a motor driven vehicle, the combination, with driving wheels, gearing to transmit motion to said wheels, an engine, a two part driving shaft having its two parts arranged in alinement and having one part connected to said engine and the other part connected to said transmission gearing, and clutch mechanism to connect and disconnect the two parts of said shaft, of an electrical generator operatively connected to that part of said shaft which is connected to said engine, an electric motor arranged to receive current from said generator, and gearing to connect said motor to that part of said shaft which is connected to said transmission gearing.

6. In a motor driven vehicle, the combination, with driving wheels, gearing to transmit motion to said wheels, an engine, a two part driving shaft having its two parts arranged in alinement and having one part connected to said engine and the other part connected to said transmission gearing, and clutch mechanism to connect and disconnect the two parts of said shaft, of an electrical generator operatively connected to that part of said shaft which is connected to said engine, an electric motor arranged to receive current from said generator, gearing to connect said motor to that part of said shaft which is connected to said transmission gearing, clutch mechanism to connect and disconnect said motor gearing and said shaft, and means to control both of said clutch mechanisms in unison.

7. In a motor driven vehicle, the combination, with driving wheels, gearing to transmit motion to said wheels, an engine, a two part driving shaft having its two parts arranged in alinement and having one part connected to said engine and the other part connected to said transmission gearing, and clutch mechanism to connect and disconnect the two parts of said shaft, of an electrical generator having its armature mounted on that portion of the shaft which is connected with said engine, a motor supported at one side of said shaft and adapted to receive current from said generator, a gear rotatably mounted on that portion of said shaft which is connected to the transmission gearing, a pinion mounted on the motor shaft, and a chain connecting said pinion and said gearing, clutch mechanism to connect said loosely mounted gear to said shaft, and means under the control of the driver for operating said clutch mechanisms.

8. In a motor driven vehicle, the combination, with driving wheels, gearing to transmit motion to said wheels, an engine, a two part driving shaft having its two parts arranged in alinement and having one part connected to said engine and the other part connected to said transmission gearing, and clutch mechanism to connect and disconnect the two parts of said shaft, of an electrical generator having its armature mounted on that portion of the shaft which is connected with said engine, a motor supported at one side of said shaft and adapted to receive current from said generator, a gear rotatably mounted on that portion of said shaft which is connected to the transmission gearing, a pinion mounted on the motor shaft, and a chain connecting said pinion and said gearing, clutch mechanism to connect said loosely mounted gear to said shaft, a controlling device for said motor, and a single means for controlling both of said clutch mechanisms and said controlling means for said motor.

9. In a motor vehicle, the combination, with ground wheels, transmission gearing therefor, an engine, clutch mechanism for connecting said engine with said transmission gearing, an electric motor, clutch mechanism for connecting said motor with said transmission gearing, and controlling devices for said motor, of a lever and means to operatively connect the same to both of said clutch mechanisms and to said controlling device.

In testimony whereof, I affix my signature in presence of two witnesses.

W. PEARCE RAYNER.

Witnesses:
W. P. DUNN,
E. W. OMENSETTER.